United States Patent
Rice et al.

[19]

[11] Patent Number: 6,158,540
[45] Date of Patent: Dec. 12, 2000

[54] GROUND EFFECT FLYING CRAFT WITH SIMPLIFIED AIR CUSHION TAKE-OFF AID

[76] Inventors: Paul Rice; Joe Rice, both of 4811 W. Lattin Rd., West Richland, Wash. 99353

[21] Appl. No.: 09/196,416

[22] Filed: Nov. 19, 1998

[51] Int. Cl.⁷ ..................................................... B60V 1/18
[52] U.S. Cl. ......................... 180/117; 180/126; 244/23 R
[58] Field of Search ................................... 180/116, 117, 180/120, 121, 125, 126; 114/67 A; 244/12.1, 12.4, 23 R

[56] References Cited

U.S. PATENT DOCUMENTS

| | | | |
|---|---|---|---|
| 3,190,582 | 6/1965 | Lippisch | 244/12 |
| 3,903,832 | 9/1975 | Ishida | 115/1 C |
| 3,908,783 | 9/1975 | Joerg et al. | 180/116 |
| 4,151,893 | 5/1979 | Mantle | 180/116 |
| 4,643,268 | 2/1987 | Jones et al. | 180/116 |
| 4,712,630 | 12/1987 | Blum | 180/117 |
| 5,314,035 | 5/1994 | Schoell | 180/119 |
| 5,335,742 | 8/1994 | Blum | 180/117 |
| 5,636,702 | 6/1997 | Kolacny | 180/122 |
| 5,727,495 | 3/1998 | Reslein | 114/272 |
| 5,941,331 | 8/1999 | Gastesi | 180/120 |

OTHER PUBLICATIONS

Alexeyev, Stanislav S., "Creation of High–Speed Amphibious Boats Using Ground Proximety Effect on the Example of Server Boats", Workshop Proceedings of Ekranoplans and Very Fast Craft. Sydney (1996): pp. 134–135.

Fischer, Hanno, "Some Thoughts About The Use of Lift–off Aids as One Condition for the Economical Operation of WIG Ships", Workshop Proceedings of Ekranoplans and Very Fast Craft. Sydney (1996): pp. 60–77.

Fischer, Hanno, "RFB Research and Development in WIG Vehicles", American Institute of Aeronautics and Astronautics, Inc. (1989): pp. 364–366.

Gallington, Roger W., "Ram Wing Surface Effect Boat", Journal of Hydronautics, vol. 7, No. 3, Jul. 1973, pp. 118–123.

Greene, William J., "The Hoverplane Advanced Wingship Design from Wingship Inc.", Workshop Proceedings of Ekranoplans and Very Fast Craft. Sydney (1996): pp. 295–298.

Handler, Eugene H., "Practical Considerations Regarding Wing–In–Ground Effect Aircraft", Journal of Hydronautics, vol. 11 No. 2, Apr. 1977, pp. 35–36.

Hooker, Stephan F., "A Review of Current Technical Knowledge Necessary to Develop Large Scale Wing–In–Surface Effect Craft", American Institute of Aeronautics and Astronautics, Inc., 1989, pp. 389–391.

"When Ships Have Wings", Air and Space, Dec. 1995/Jan. 1996, pp. 52–59.

"High–Stepping Heavy Haulers", Popular Mechanics, Jun. 1995, p. 30.

"Flying on Water", Popular Science, Jan. 1997, pp. 50–54.

*Primary Examiner*—Brian L. Johnson
*Assistant Examiner*—Avraham H. Lerner

[57] ABSTRACT

A ground effect flying craft utilizing a pressure cavity (10) for low speed support on a static air cushion. The cavity is bounded by a streamlined aft body (18), a fore body (24), and side plates (22) which allow for low drag and high lift at cruise speed on a dynamic air cushion. Static lift pressure and dynamic thrust are provided by a fixed dual purpose propulsor (20'). Flow diverting devices or auxiliary power units are not needed for transition from static lift to dynamic flight.

10 Claims, 3 Drawing Sheets

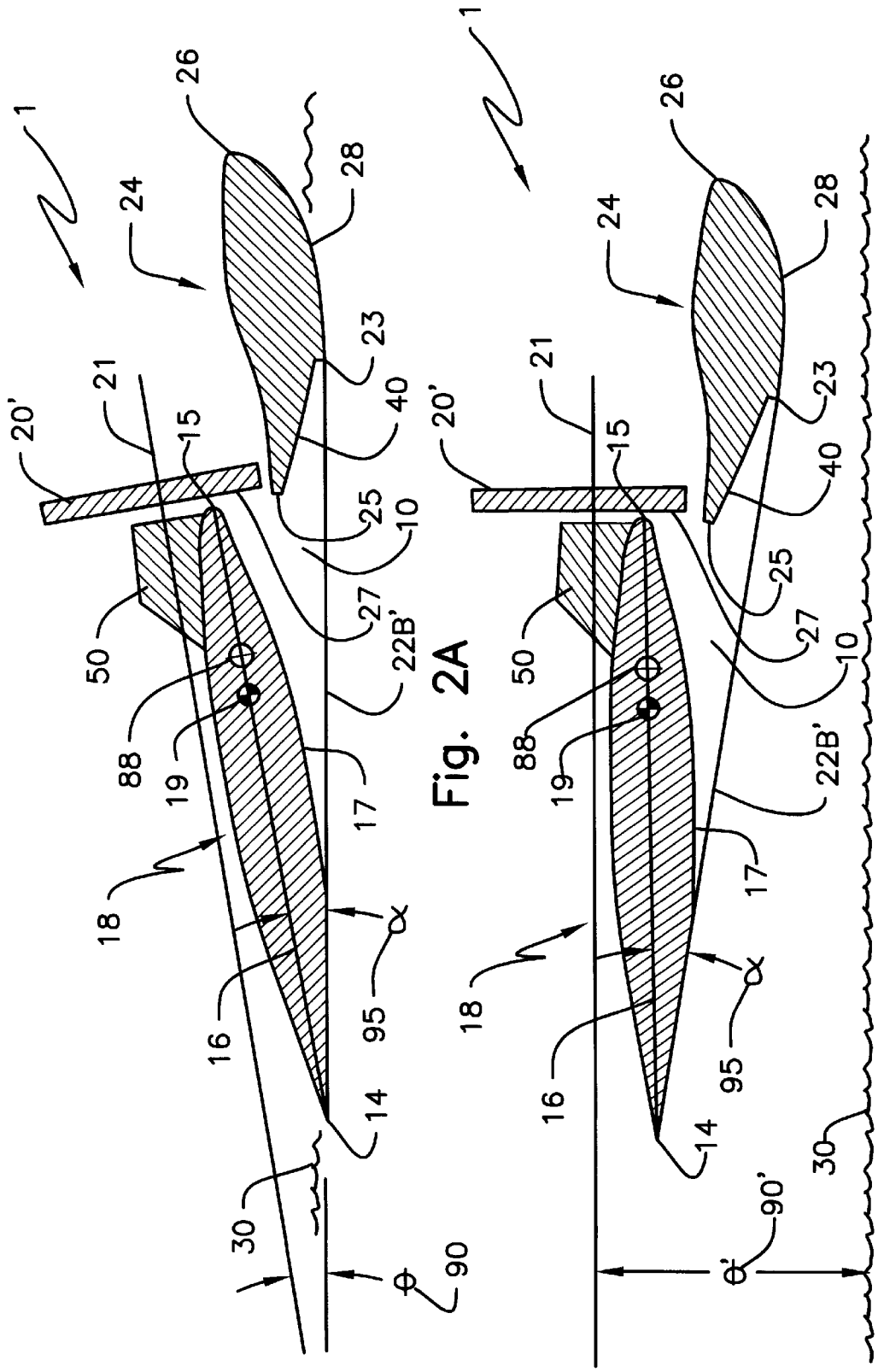

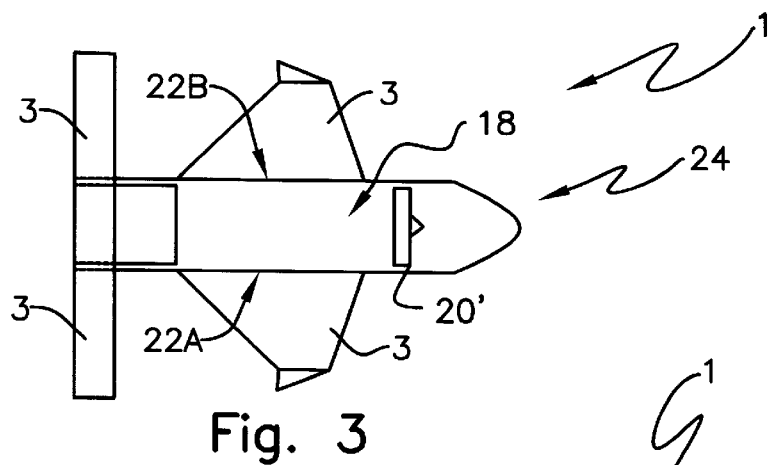
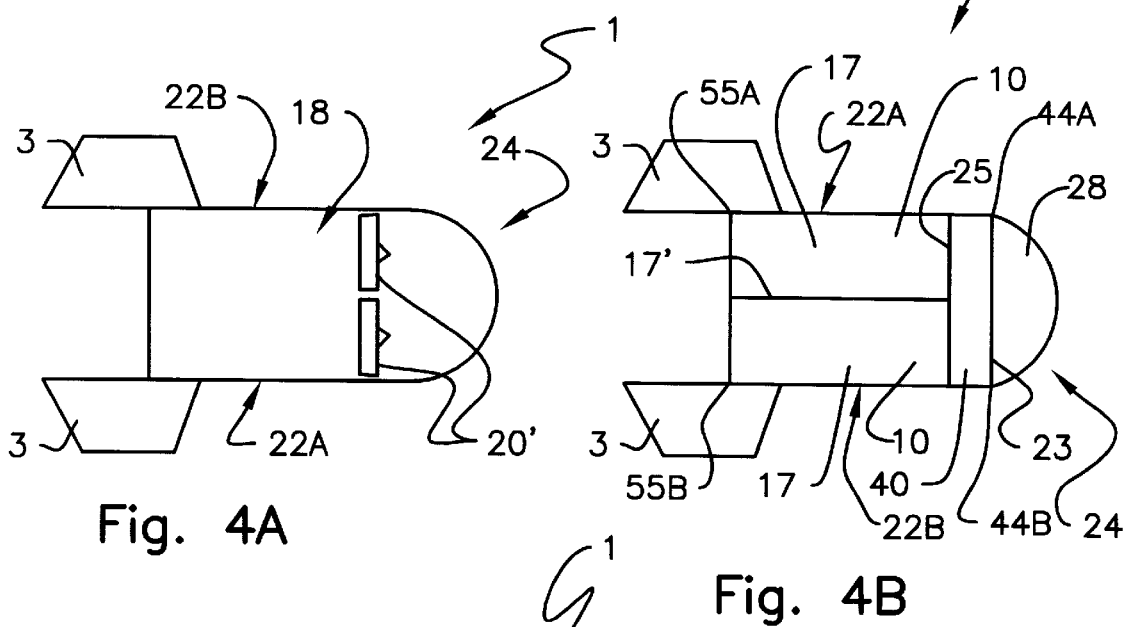
Fig. 3
Fig. 4A
Fig. 4B
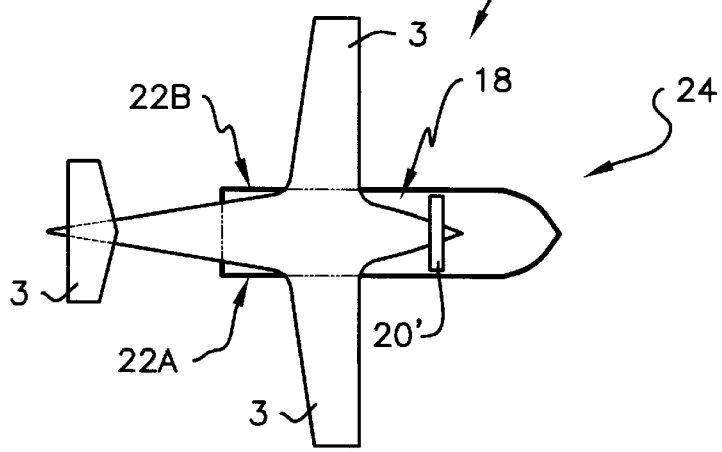
Fig. 5

GROUND EFFECT FLYING CRAFT WITH SIMPLIFIED AIR CUSHION TAKE-OFF AID

FIELD OF THE INVENTION

This invention relates to ground effect flying craft, and more particularly to air cushion take-off aids for such craft.

BACKGROUND OF THE INVENTION

Ground Effect Flying Boats (GEFB) or Wing In Ground-effect (WIG) craft operate very efficiently when flying close to the water surface on a dynamic air cushion. Lift is increased due to higher, more uniform pressure created in the cushion under the wing, while parasite drag is reduced due to low velocity in the air cushion. Induced drag is greatly reduced by near elimination of wing tip vortices due to close proximity of the wing tips with the ground. However, these craft have historically been overpowered. One of the reasons for the excessive power is the high drag encountered in the water-borne mode. Numerous tests have shown that the peak "hump" drag in the water-borne mode is approximately 2.7 times the drag present during low speed flight in ground effect. A second reason for high power requirement is the inherently low propulsive efficiency of air propellers and jets at low vehicle speed. For example, a standard fixed pitch propeller designed for maximum efficiency at cruise speed will achieve only about 20% propulsive efficiency at the speed corresponding to the hump drag. A variety of take-off aids designed to reduce hydrodynamic drag are seen in the prior art.

One popular method is the use of Power Augmented Ram Wmg In Ground-effect (PARWIG). The well known aerodynamicist Alexander Lippisch utilized this technique in his U.S. Pat. No. 3,190,582 (1965). By mounting the air propeller ahead of the wing leading edge a sufficient distance, he was able to achieve a ram effect under the wing to produce a slight static lift at low speed, thus reducing wave making drag somewhat. The reported power required to achieve takeoff of the 550 lb. craft was 15 hp, while the minimum cruise power in ground effect was measured at 4 to 5 hp. For free flight, the power requirement rose to 18 to 20 hp. Thus, even with this take-off aid, the power required to take off was three times the power required to sustain flight in ground effect.

Another PAR WIG craft is the subject of U.S. Pat. No. 4,712,630 by Blum (1987). This craft utilizes a diffuser duct to smoothly spread the airflow from a forward mounted propulsor to the wide space under the lifting body. The object is to uniformly "fill" the space in an attempt to control backflow. Lateral diffusion of the airflow as proposed will reduce the velocity in approximate proportion to the increased lifting area exposed. Unfortunately, since dynamic pressure is proportional to the square of the velocity, the pressure is reduced substantially for a given area increase. As a result, the diffuser duct actually reduces net lift. In addition, the very small diameter propulsor that is required to fit in the neck of the diffuser duct must operate at very high velocity in order to develop adequate thrust, and therefore has relatively low propulsive efficiency. A further disadvantage of the design is the use of a pilot controlled damper to block flow exiting under the body in order to create static lift pressure. The damper can create an unstable flight condition at the moment of take-off when airflow escapes under the body trailing edge. Sudden downward deflection of the airflow at the trailing edge causes the lift force to suddenly shift to the rear, placing demands on the pilot during the critical take-off transition when balance is essential.

Another, more effective method of reducing hydrodynamic drag is the use of an air pressurized cavity under the hull. The cavity is a void space interposed between the hull and the water typically bounded by the hull sides, the water surface, and moveable gates at the fore and aft ends of the cavity. Air is pressurized by a fan and fed to the cavity. The air pressure imposed between the hull and the water lifts the hull, reducing wave making drag. Additionally, leakage of pressurized air between the water and hull planing surfaces greatly reduces frictional drag. An application of this "hovercraft" technique is presented in U.S. Pat. No. 3,903,832 granted to Ishida et al (1975). The rear half of the craft utilizes a pressurized cavity, powered by a fan separate from the main propulsion fan. The forward half of the craft is designed as a ram wing to take advantage of dynamic lift at high forward speed. Unfortunately, the lift fan is required at all speeds, does not contribute to propulsion, and consumes large amounts of power. Furthermore, location of the static lift cavity behind the craft CG makes it impossible to lift the forward hull portion which results in high wave making drag.

Another method for achieving a pressurized static lift device is depicted in U.S. Pat. No. 4,151,893 by Peter Mantle (1977). Several pressurized cavity designs are proposed, most of which use the same engine for both propulsion and lift. However, all methods shown depend on the added complexity of flow diverting ducts, dampers, and gates. These devices reduce flow efficiency and add cost. Additionally, dependence on these devices compromises safe operation during the critical transition from water-borne to air-borne mode.

Yet another pressurized cavity lift system is presented in U.S. Pat. No. 5,636,702 by Gordon Kolacny (1997). A common compressor means is used for both propulsion and pressurization of a cavity to generate lift at low speed. The cavity configuration requires the use of movable confinement flaps in order to transition from the low speed hover mode to a streamlined flight mode. Dependence on the flaps for control during the critical transition period places extra demands on the pilot, compromising safety. Additionally, the compressor means utilizes high pressure fans or turbines which develop higher pressures and velocities than are desired for optimum propulsive efficiency.

In summary, the shortcomings of existing air cushion take-off aids for ground effect craft are the following:

a) Power augmented ram wing lift systems are inefficient, have inherent backflow, and develop low pressure.

b) Pressurized cavity lift systems most often are designed with auxiliary high pressure lift fans and motors that consume extra power and add weight.

c) Methods used to effect transition from static to dynamic lift modes include movable jets, diffusers, and/or control dampers. These devices add complexity and cost, and often compromise safety.

The patents and patent publications referred to herein and relied upon are provided in an Information Disclosure Statement in accordance with 37 CFR 1.97.

SUMMARY OF THE INVENTION

The present invention discloses the use of a pressurized cavity take-off aid for a ground effect craft with the following objects and advantages:

1. A fixed position dual purpose propulsion device (such as an aircraft propeller) provides both thrust to accelerate the craft and pressurized air for cavity lift. Auxiliary lift fans or motors are not required. Experiments performed with a model having a pressure cavity according to this invention with a ½ horsepower motor driving an aircraft propeller verified that the maximum dynamic pressure available from the propeller slipstream was completely converted to static lift pressure in the cavity, and was more than adequate to lift the five pound model.

2. The propulsion device is low in the craft because the lower portion of the propulsion disc (i.e. the circular plane defined by a rotating propulsion device) coincides with the pressure cavity inlet so as to feed approximately one third of the total propulsor airflow directly to the cavity without the need for diverting ducts or dampers.

3. The low mounted propulsor results in a lower center of gravity relative to other craft, resulting in improved roll stability. Additionally, the thrust line is closer to the location of the net affective drag force, which reduces the down pitching moment of the craft, which in turn reduces the required stabilizing force.

4. The cavity shape is designed so that airflow through the cavity is streamlined (i.e. minimum drag) when the craft is airborne. This is accomplished without the use of movable gates at the fore and aft ends of the cavity.

5. The absence of moveable gates in the cavity allows for a smooth transition from the water borne mode to the airborne mode as take-off occurs. A rear gate is especially dangerous due to a sudden change in aerodynamic balance when escaping air is deflected downward by the gate at the moment of take-off. This effect was tested in a wind tunnel and with powered ground effect models having turned down trailing surfaces. The result was always a sudden shift of the lift force rearward when take-off occurred, causing the craft to pitch down abruptly.

6. The cost to produce the air cushion take-off aid of this invention is very minimal, as the working features of the cavity are integrated into the basic vehicle structure. Auxiliary fans, motors, ducts and control dampers and gates are not required.

7. The air cushion take-off aid of this invention may be incorporated into a ground effect flying craft having a variety of wing configurations, including none at all.

8. The air cushion take-off aid of this invention may be incorporated into a flying boat or seaplane capable of free flight out of ground effect.

9. The air cushion take-off aid of this invention could be incorporated into amphibious or land based vehicles, and is not limited to water based craft.

10. The application of the invention is not limited by vehicle size.

11. The air cushion take-off aid of this invention may be applied to vehicles with widely diverse purposes, such as commercial, personal, and military functions.

12. A wide variety of power plants may be used to drive the propulsion devices, including but not limited to piston, rotary, and turbine engines, as well as any power plant that is primarily a thrust means, such as a turbojet or rocket engine which can interface directly with the pressure cavity inlet.

13. The air cushion take-off aid of this invention may be incorporated into a ground effect flying craft having a pressure cavity with a plurality of longitudinal divider plates and having multiple propulsion units which may be located to pressurize individual cavity compartments to enhance stability and control.

14. A wide range of structural configurations other than that shown by the preferred embodiment of this invention are possible as long as the pressure cavity performs as described herein.

Operation of the craft is as follows:

A pressure cavity is bounded by an aft body lower surface, a fore body aft surface, a propulsor disc aft surface, left and right side plate inner surfaces, and a ground effect surface (such as water) when the craft is at rest or at low speed. In order to accelerate the craft, power is applied to the propulsor, which in turn creates a high velocity slipstream. Approximately ⅓ of the slipstream volume flow is fed directly to the pressure cavity inlet. Close clearance between the propulsor disk surfaces, the aft body leading edge, and the fore body trailing edge prevents backflow, so that complete flow stagnation occurs in the pressure cavity. Thus, maximum pressure is available for lift of the craft. The pressure cavity extends forward to a hydrodynamic step located on the fore body lower surface sufficiently forward to ensure that the pressure cavity center of pressure will be forward of the center of gravity of the complete craft. It is essential that the craft be balanced in this way to ensure a positive angle of attack of the craft during the waterborne mode, thereby aiding lift and minimizing wave making drag. The combined surface area under the aft body and the fore body exposed to cavity pressure is large enough to generate a lift force equal to or greater than the weight of the craft. Cavity pressure will be relieved as the craft is lifted to the surface, and the escaping air will leak under the planing surfaces, reducing frictional drag as the craft moves forward. Additional lift is generated by the propulsor due to the inclination of the propulsor thrust line. The thrust line of the propulsor is preferably inclined at an angle between 4 and 7 degrees (up) relative to the ground effect surface when the craft is at rest. This angle allows for a vertical component of the thrust when the craft is on the surface. The propulsor, being in front of the center of gravity of the craft, pulls up on the front of the craft, thereby reducing wave making drag of the fore body.

Following take-off of the craft from the ground effect surface, the craft is elevated by a lifting and stabilizing means (such as wings) to ride on the dynamic ground effect air cushion. In this position as the craft leaves the ground effect surface, the pressure cavity ceases to exist. The flow from the propulsor is entirely streamlined as it passes over and under the aft body. Streamlined flow is achieved without the use of dampers, gates, or any other auxiliary equipment. The transition from static lift at low speed to dynamic lift at high speed is extremely simple and highly efficient.

The inclination of the thrust line relative to the ground effect surface becomes lessened at higher speeds (since net resultant drag forces are below the thrust line), reducing the angle of attack of the craft which lessens lift and drag. The reduction of lift is a benefit to ground effect craft, which tend to gain too much height above the ground effect surface as speed increases. To maximize propulsive efficiency, the angle of the thrust line relative to the aft body aerodynamic chord line should be as close to zero as possible. This criteria, in combination with the desire to have the thrust line inclination angle be nonzero for reasons stated above, results in the creation of a range of favorable angles for both the aerodynamic chord line inclination and the thrust line inclination.

The net effect of all drag reducing features of the invention is to greatly increase acceleration of the craft. Take-off speed is achieved in much shorter distance and with much less power than is required with conventional planing hulls. A model was constructed and tested to compare acceleration rates and power requirements with and without the pressure cavity take-off aid of this invention. The take-off aid increased the acceleration by 80% and cut the take-off distance in half. The required take-off power did not exceed the maximum power useable in ground effect flight.

BRIEF DESCRIPTION OF THE DRAWINGS

The foregoing and other features and advantages of the present invention will become more readily appreciated as the same become better understood by reference to the following accompanying drawings, wherein:

FIG. 2A is a section view taken through FIG. 1A showing functional design features of the pressure cavity, and showing the relationship of the pressure cavity with a center of gravity, a center of pressure, an aft body having an aerodynamic chord with an inclination angle relative to left bottom edge, a fore body having a hydrodynamic step, a propulsor located at the inlet opening of the cavity, a propulsor thrust line with a thrust line inclination angle relative to left bottom edge, left side plate, and the ground effect surface (such as water) when at rest.

FIG. 2B is a section view taken through FIG. 1A showing functional design features of the pressure cavity, and showing the relationship of the pressure cavity with a center of gravity, a center of pressure, an aft body having an aerodynamic chord with a chord inclination angle relative to left bottom edge, a fore body having a hydrodynamic step, a propulsor located at the inlet opening of the cavity, a thrust line with a thrust line inclination angle essentially parallel with the ground effect surface, left side plate, left bottom edge and the ground effect surface (such as water) when in flight.

FIG. 3 shows a top plan view of an additional embodiment of the invention incorporated into a ground effect flying craft having a lifting and stabilizing means consisting of a reverse delta wing and high aspect ratio horizontal stabilizer showing the relationship between an aft body, a fore body, a propulsor, and right and left side plates.

FIG. 4A shows a top plan view of another embodiment of the invention incorporated into a ground effect flying craft capable of having a divided pressure cavity and multiple propulsors, showing the relationship between an left body, a fore body, propulsors, right and left side plates, and lifting and stabilizing means.

FIG. 4B shows a bottom plan view of the embodiment of the invention shown in FIG. 4A demonstrating a divided pressure cavity and multiple propulsors shown as first and second propulsors, demonstrating the relationship between the aft body lower surface having a divider plate, a fore body, first and second propulsors, right and left side plates, and lifting and stabilizing means.

FIG. 5 shows a top plan view of yet another embodiment of the invention incorporated into a flying boat or seaplane having a lifting and stabilizing means consisting of a high aspect ratio main wing and stabilizer showing the relationship between an aft body, a fore body, a propulsor, and right and left side plates.

DETAILED DESCRIPTION

Figure 1A:
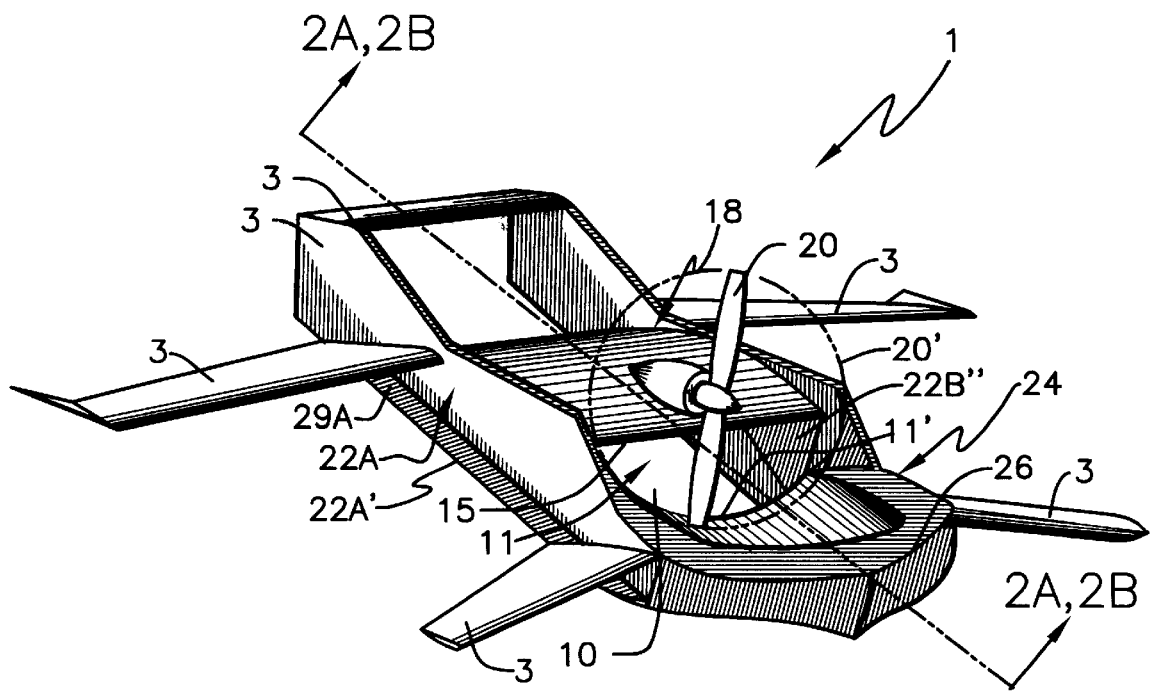
FIG. 1A shows a top front perspective view of the preferred embodiment of the invention incorporated into a ground effect flying craft having a tandem wing lifting and stabilizing means, showing the relationship of the pressure cavity to an aft body, a fore body, a propulsor, an inlet opening having an inlet opening perimeter, and right and left side plates having right and left bottom edges with right and left non-trip chines.
Figure 1B:
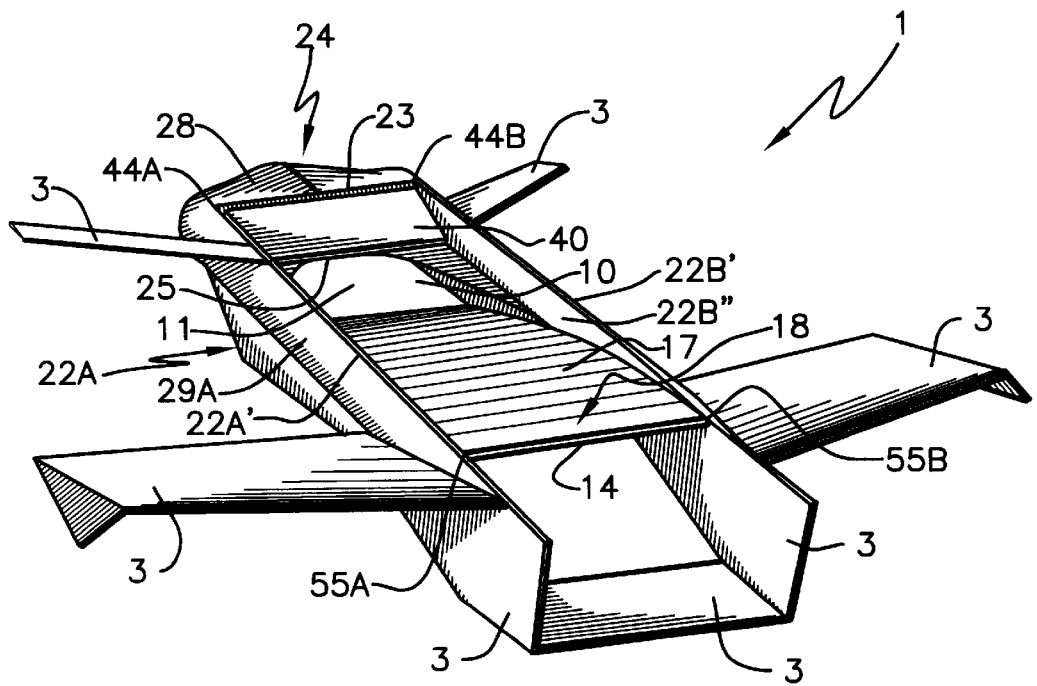
FIG. 1B shows a bottom rear perspective view of the preferred embodiment of the invention incorporated into a ground effect flying craft having a tandem wing lifting and stabilizing means, showing the relationship of the pressure cavity to an aft body having a trailing edge with right and left endpoints, a fore body having a hydrodynamic step with right and left endpoints, an inlet opening to the pressure cavity, and right and left side plates having right and left bottom edges with right and left non-trip chines.

The invention as disclosed herein and illustrated in FIGS. 1A through 5 illustrates the Ground Effect Flying Craft 1 with Simplified Air Cushion Take-off Aid. The structure is as follows:

A fore body 24, shown in FIGS. 1A, 1B, 2A, 2B, 3, 4A and 5 is preferably a streamlined (i.e. low drag) shape having a fore body leading edge 26 as. shown in FIGS. 1A, 2A and 2B, a fore body trailing edge 25 shown in FIGS. 1B, 2A, 2B and 4B, a hydrodynamic step 23 shown in FIGS. 1B, 2A, 2B and 4B having right and left step endpoints 44A and 44B shown in FIGS. 1B and 4B, a fore body aft surface 40 extending from fore body trailing edge 25 downward and forward to hydrodynamic step 23 shown in FIGS. 1B, 2A, 2B and 4B, and a fore body lower surface 28 preferably shaped in the form of a planing boat hull forward and upward of hydrodynamic step 23 towards fore body leading edge 26 shown in FIGS. 1B, 2A, 2B and 4B.

An aft body 18 shown in FIGS. 1A, 1B, 2A, 2B, 3, 4A and 5 is preferably a streamlined shape having an aft body leading edge 15 shown in FIGS. 1A, 2A and 2B, an aft body trailing edge 14 shown in FIGS. 1B, 2A and 2B having right and left trailing edge endpoints 55A and 55B shown in FIGS. 1B and 4B, the aft body 18 having an aerodynamic chord 16 shown in FIGS. 2A and 2B having a chord inclination angle alpha 95 shown in FIGS. 2A and 2B, and an aft body lower surface 17 extending forward and upward from aft body trailing edge 14 to aft body leading edge 15 shown in FIGS. 1B, 2A, 2B, and 4B. Center of gravity 19 shown in FIGS. 2A and 2B is located behind center of pressure 88 shown in FIGS. 2A and 2B.

A propulsor 20' shown in FIGS. 1A, 2A, 2B, 3, 4A and 5 driven by power plant 50 shown in FIGS. 2A and 2B and having a propulsor disk aft surface 27 shown in FIGS. 2A and 2B and a thrust line 21 having a thrust line inclination angle theta 90 shown in FIGS. 2A and 2B, wherein the propulsor disk aft surface 27 is defined as the area transcribed by rotary motion of propulsor 20'.

Right and left side plates 22A and 22B respectively shown in FIGS. 1A, 1B, 3, 4A, 4B and 5 having right and left inner surfaces 22A" and 22B" shown in FIGS. 1A and 1B, and right and left bottom edges 22A' and 22B' shown in FIGS. 1A, 1B, 2A and 2B, having right and left non-trip chines 29A and 29B shown in FIGS. 1A and 1B.

An inlet opening 11 shown in FIGS. 1A and 1B, to pressure cavity 10 shown in FIGS. 1A, 1B, 2A and 2B. Inlet opening perimeter 11' is defined by fore body trailing edge 25 and aft body leading edge 15 in the plane of propulsor disc aft surface 27.

An embodiment having a divided pressure cavity is shown with divider plate 17' in FIG. 4B.

Lifting and stabilizing means 3 are shown in FIGS. 1A, 1B, 3, 4A, 4B, and 5.

Pressure cavity 10 is bounded above and to the rear of propulsor disk aft surface 27 by aft body lower surface 17; below by ground effect surface 30; forward and below propulsor disk aft surface 27 by fore body aft surface 40; at the right and left sides by right and left inner surfaces 22A" and 22B"; and at the front by inlet opening 11.

Right and left bottom edges 22A' and 22B' connect right and left step endpoints 44A and 44B with right and left trailing edge endpoints 55A and 55B. Side plates 22A and 22B form a structural connection between fore body 24 and aft body 18. Hydrodynamic step 23, right and left bottom edges 22A' and 22B', and right and left trailing edge endpoints 55A and 55B all lie in a common plane.

In the preferred embodiment, chord inclination angle alpha 95 is between 8 degrees and 14 degrees with respect to left bottom edge 22B' shown in FIGS. 2A and 2B. Cavity 10 should be constructed such that center of pressure 88 lies between center of gravity 19 and hydrodynamic step 23 as shown in FIGS. 2A and 2B. Center of gravity 19 should be located between 25% and 40% of aerodynamic chord 16. Thrust line inclination angle theta 90 is between 4 degrees and 7 degrees with respect to the left bottom edge 22B' as shown in FIG. 2A. Thrust line 21 ideally is parallel to ground effect surface 30 as shown by thrust line inclination angle theta' 90' when craft is flying as shown in FIG. 2B.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A ground effect flying craft comprising a pressure cavity, a lifting and stabilizing means, and at least one power plant driving at least one propulsor, said ground effect flying craft has a fore body, an aft body, an inlet opening, a center of gravity, and right and left side plates;
    (a) said fore body has a fore body trailing edge, a fore body leading edge, a hydrodynamic step having right and left step endpoints, a fore body aft surface, and a fore body lower surface;
    (b) said aft body has an aft body leading edge, an aft body trailing edge having right and left trailing edge endpoints, an aerodynamic chord having a chord inclination angle, and an aft body lower surface;
    (c) said propulsor has a thrust line having a thrust line inclination angle, and a propulsor disk aft surface defined by the area transcribed by rotary motion of said propulsor;
    (d) said right and left side plates have right and left inner surfaces and right and left bottom edges;
    (e) said hydrodynamic step and said right and left bottom edges are adapted to be in contact with a ground effect surface when said craft is at rest,
    (f) said inlet opening has an inlet opening perimeter defined by said fore body trailing edge and said aft body leading edge in the plane of said propulsor disk aft surface,
    (g) said pressure cavity has a center of pressure,
    (h) said fore body aft surface extends from said fore body trailing edge downward and forward to said hydrodynamic step, and said fore body lower surface is shaped in the form of a planing boat hull forward and upward of said hydrodynamic step towards said fore body leading edge;
    (i) said aft body lower surface extends forward and upward from said aft body trailing edge to said aft body leading edge;
    (j) said center of pressure is located between said center of gravity and said hydrodynamic step.

2. The craft of claim 1 wherein said pressure cavity is bounded above and to the rear of said propulsor disk aft surface by said aft body lower surface; below by said ground effect surface; forward and below said propulsor disk aft surface by said fore body aft surface; at the right and left sides by said right and left inner surfaces; and at the front by said inlet opening.

3. The craft of claim 2 wherein said right and left bottom edges connect said right and left step endpoints with said right and left trailing edge endpoints; said side plates form a structural connection between said fore body and said aft body; and said hydrodynamic step, said right and left bottom edges, and said aft body right and left trailing edge endpoints all lie in a common plane.

4. The craft of claim 3 wherein said pressure cavity contains one or a plurality of divider plates.

5. The craft of claim 3 wherein said chord inclination angle is between 8 and 14 degrees with respect to said right and left bottom edges; and said thrust line inclination angle is between 4 and 7 degrees with respect to said right and left bottom edges.

6. A ground effect flying craft comprising a pressure cavity and at least one power plant driving at least one propulsor; said ground effect flying craft has a fore body, an aft body, an inlet opening, a center of gravity, and right and left side plates;
    (a) said fore body has a fore body trailing edge, a fore body leading edge, a hydrodynamic step having right and left step endpoints, a fore body aft surface, and a fore body lower surface;
    (b) said aft body has an aft body leading edge, an aft body trailing edge having right and left trailing edge endpoints, an aerodynamic chord having a chord inclination angle, and an aft body lower surface;
    (c) said propulsor has a thrust line having a thrust line inclination angle, and a propulsor disk aft surface defined by the area transcribed by rotary motion of said propulsor;
    (d) said right and left side plates have right and left inner surfaces and right and left bottom edges;
    (e) said hydrodynamic step and said right and left bottom edges are adapted to be in contact with a ground effect surface when said craft is at rest,
    (f) said inlet opening has an inlet opening perimeter defined by said fore body trailing edge and said aft body leading edge in the plane of said propulsor disk aft surface,
    (g) said pressure cavity has a center of pressure,
    (h) said fore body aft surface extends from said fore body trailing edge downward and forward to said hydrodynamic step, and said fore body lower surface is shaped in the form of a planing boat hull forward and upward of said hydrodynamic step towards said fore body leading edge;
    (i) said aft body lower surface extends forward and upward from said aft body trailing edge to said aft body leading edge;
    (j) said center of pressure is located between said center of gravity and said hydrodynamic step.

7. The craft of claim 6 wherein said pressure cavity is bounded above and to the rear of said propulsor disk aft surface by said aft body lower surface; below by said ground effect surface; forward and below said propulsor disk aft surface by said fore body aft surface; at the right and left sides by said right and left inner surfaces; and at the front by said inlet opening.

8. The craft of claim 7 wherein said right and left bottom edges connect said right and left step endpoints with said right and left trailing edge endpoints; said side plates form a structural connection between said fore body and said aft body; and said hydrodynamic step, said right and left bottom edges, and said aft body right and left trailing edge endpoints all lie in a common plane.

9. The craft of claim 8 wherein said pressure cavity contains one or a plurality of divider plates.

10. The craft of claim 8 wherein said chord inclination angle is between 8 and 14 degrees with respect to said right and left bottom edges; and said thrust line inclination angle is between 4 and 7 degrees with respect to said right and left bottom edges.

* * * * *